United States Patent [19]

Spencer

[11] 4,205,726
[45] Jun. 3, 1980

[54] HORSESHOE MANUFACTURE

[76] Inventor: Dudley W. C. Spencer, 619 Shipley Rd., Wilmington, Del. 19809

[21] Appl. No.: 946,016

[22] Filed: Sep. 26, 1978

Related U.S. Application Data

[63] Continuation-in-part of Ser. No. 762,394, Jan. 26, 1977, Pat. No. 4,116,278.

[51] Int. Cl.² .............................................. A01L 5/00
[52] U.S. Cl. ....................................................... 168/4
[58] Field of Search ..................... 168/4, 6, 10, 13, 19, 168/24, 28

[56] References Cited

U.S. PATENT DOCUMENTS

| 308,926 | 12/1884 | Porter | 168/10 |
| 2,353,568 | 7/1944 | King | 168/13 |
| 3,967,683 | 7/1976 | Ensinzo | 168/4 |
| 4,116,278 | 9/1978 | Spencer | 168/4 |

Primary Examiner—Hugh R. Chamblee
Attorney, Agent, or Firm—Connolly and Hutz

[57] ABSTRACT

A horseshoe comprises a U-shaped body member made of resilient material and having an upstanding projection at each of its free ends for fitting into corresponding pockets in the hoof with the horseshoe being additionally secured to the hoof by nails.

1 Claim, 3 Drawing Figures

HORSESHOE MANUFACTURE

CROSS REFERENCE TO RELATED APPLICATION

This application is a continuation-in-part of application Ser. No. 762,394, filed Jan. 26, 1977 and now U.S. Pat. No. 4,116,278 issued Sept. 26, 1978.

BACKGROUND OF INVENTION

This invention relates to improvements in horseshoe manufacture and more specifically to the type of manufacture with which aforesaid U.S. Pat. No. 4,116,278 relates.

SUMMARY OF INVENTION

A resilient U-shaped horseshoe includes projections or tabs at its free ends for fitting into the corresponding pockets in a hoof with the shoe additionally secured by nails spaced around the U-shaped body member including the bight so as to permit flexing of the shoe without the necessity for providing any hinges to compensate for any expansion or contraction of the hoof thereby maximizing foot comfort and stabilizing the heel area.

The U-shaped body member may have a completely planar upper surface without any rim. Alternatively rim portions may be provided at spaced locations along the outer edge of the body member or a continuous rim may be provided along the entire outer edge extending inwardly and upwardly toward the inner edge.

If desired, an adhesive may be applied to the upper surface of the body member to further secure the horseshoe to the hoof.

THE DRAWINGS

DETAILED DESCRIPTION

This invention relates to the horseshoe invention techniques described in the aforesaid U.S. Pat. No. 4,116,278, the details of which are incorporated herein by reference thereto.

The aforesaid patent illustrates a horseshoe which includes projections for fitting into corresponding pockets in a hoof. The illustrated embodiment further includes an upstanding rim portion and discloses the shoe as being adhesively secured to the hoof. Disclosure is also made, however, of the possibility of securing the shoe by means of conventional nails. This application is concerned with the latter practice.

Figure 1:
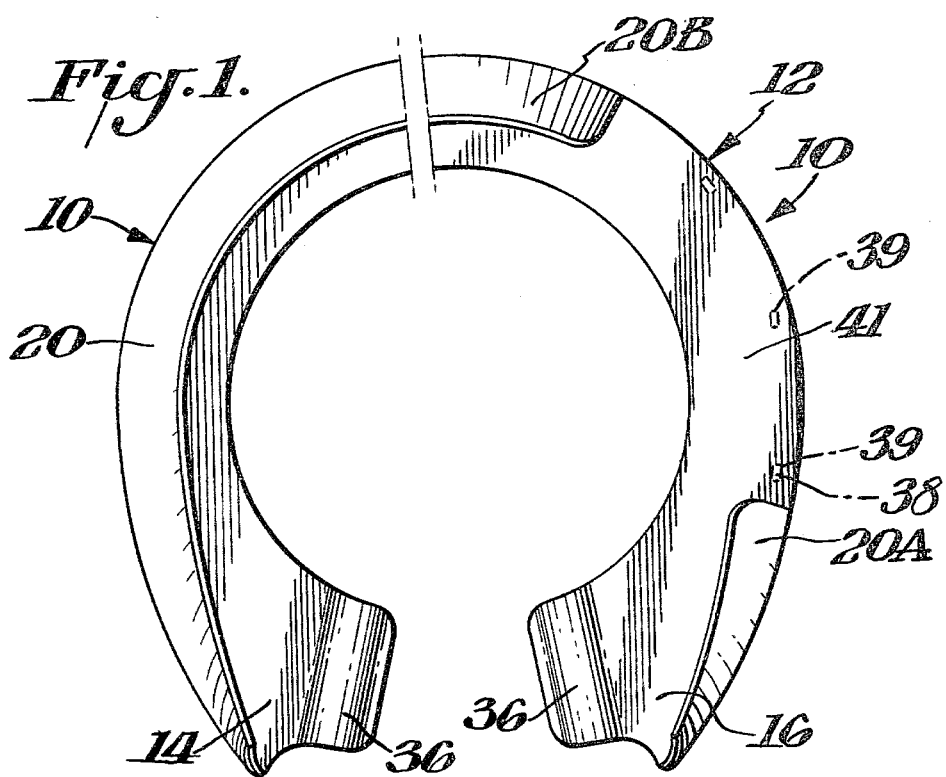
FIG. 1 is a plan view of a horseshoe illustrating various ramifications of this invention.

FIG. 1 illustrates a shoe 10 in the form of a body member 12 having a pair of free ends 14, 16. Each free end is provided with a tab or projection 36 for fitting a corresponding pocket in the hoof. As indicated in the aforesaid patent, the shoe may also include a continuous upstanding rim or wall 20 which extends from one free end to the other along the outer edge of the shoe upwardly and inwardly toward the inner edge. FIG. 1 illustrates a portion of wall 20.

Figure 2:
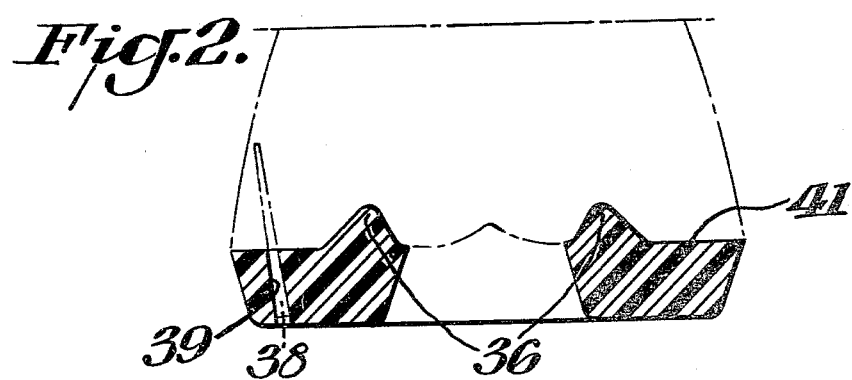
FIG. 2 is a cross-sectional view illustrating a horseshoe in accordance with one form of this invention.

FIG. 2 illustrates a particularly advantageous embodiment of this invention due to its simplified form. In this embodiment, the shoe is secured to the hoof by a plurality of nails 38 spaced around the shoe including the bight portion. In this simplified form, the shoe is rimless and it is not necessary to further include any adhesive to aid in the securement. Accordingly, the shoe need not include any liner.

Figure 3:
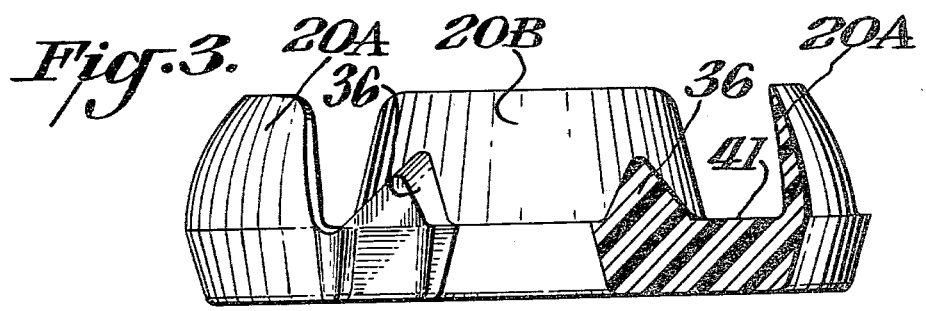
FIG. 3 is a partial sectional view illustrating another form of this invention.

FIG. 3 illustrates further possible practices of this invention. As indicated therein, the shoe includes at least one rim portion. More specifically, the illustrated embodiment shows rim portions 20A at each free end thereof and rim portion 20B at the bight. If desired, the shoe may include all three rim portions or only the end rim portions 20A or only the bight rim portion 20B or rim portions arranged in any other manner at any other locations. Again the shoe would be provided with spaced holes 39 for receiving nails 38 which penetrate the planar upper surface 41 of body member 12.

If desired, auxiliary securing means such as adhesive material and lace material may also be provided in combination with any of the aforedescribed embodiments in the manner described in U.S. Pat. No. 4,116,278

What is claimed is:

1. A horseshoe comprising a U-shaped body member terminating in a pair of free ends, said U-shaped body member having a toe portion at its bight and heel portions at said free ends with quarter portions therebetween, said body member being made of resilient material capable of being distorted out of its normal undistorted condition, said body member having an outer edge and an inner edge with a generally planar upper surface therebetween, an upstanding pocket formed at each of said free ends, each upstanding pocket comprising an upstanding projection at said inner edge and an upstanding inwardly inclined wall at said outer edge with said planar upper surface therebetween for receiving a corresponding portion of the heel of the hoof, each of said projections extending upwardly above said planar surface for fitting in corresponding pockets in the hoof, each of said projections having an inner wall disposed adjacent the space between said free ends, each of said projections having an outer wall between its inner wall and said outer edge of said body member on its free end, each of said outer walls being inclined from said planar surface upwardly and outwardly away from said outer edge of said body member at its free end, said projections being connected to each other solely by their common mounting on said resilient body member whereby the spacing between said projections is determined by the location of the pockets in the hoof, each of said upstanding walls being located directly opposite its said projection with substantially the entire length of its said projection being opposite a corresponding length portion of its said wall, a plurality of spaced nail holes extending through said body member including said toe portion and said quarter portions, and said outer edge of said body member being free of said upstanding walls at said toe portion and said quarter portions where said nail holes are located whereby the nails secured through said holes may penetrate said upper surface of said body member and the hoof without contacting an upstanding wall for cooperating with said projections and said walls in securing said horseshoe to the hoof and for cooperating with the resilient material for permitting said horseshoe to flex during any expansion or contraction of the hoof for maximizing foot comfort and stabilizing the heel area of the hoof.

* * * * *